3,148,974
METHOD FOR SEGREGATING COPPER ORES
Carl Rampacek, Tuscaloosa, Ala., assignor to the United States of America as represented by the Secretary of the Interior
Filed May 15, 1962, Ser. No. 195,013
1 Claim. (Cl. 75—72)
(Granted under Title 35, U.S. Code (1952), sec. 266)

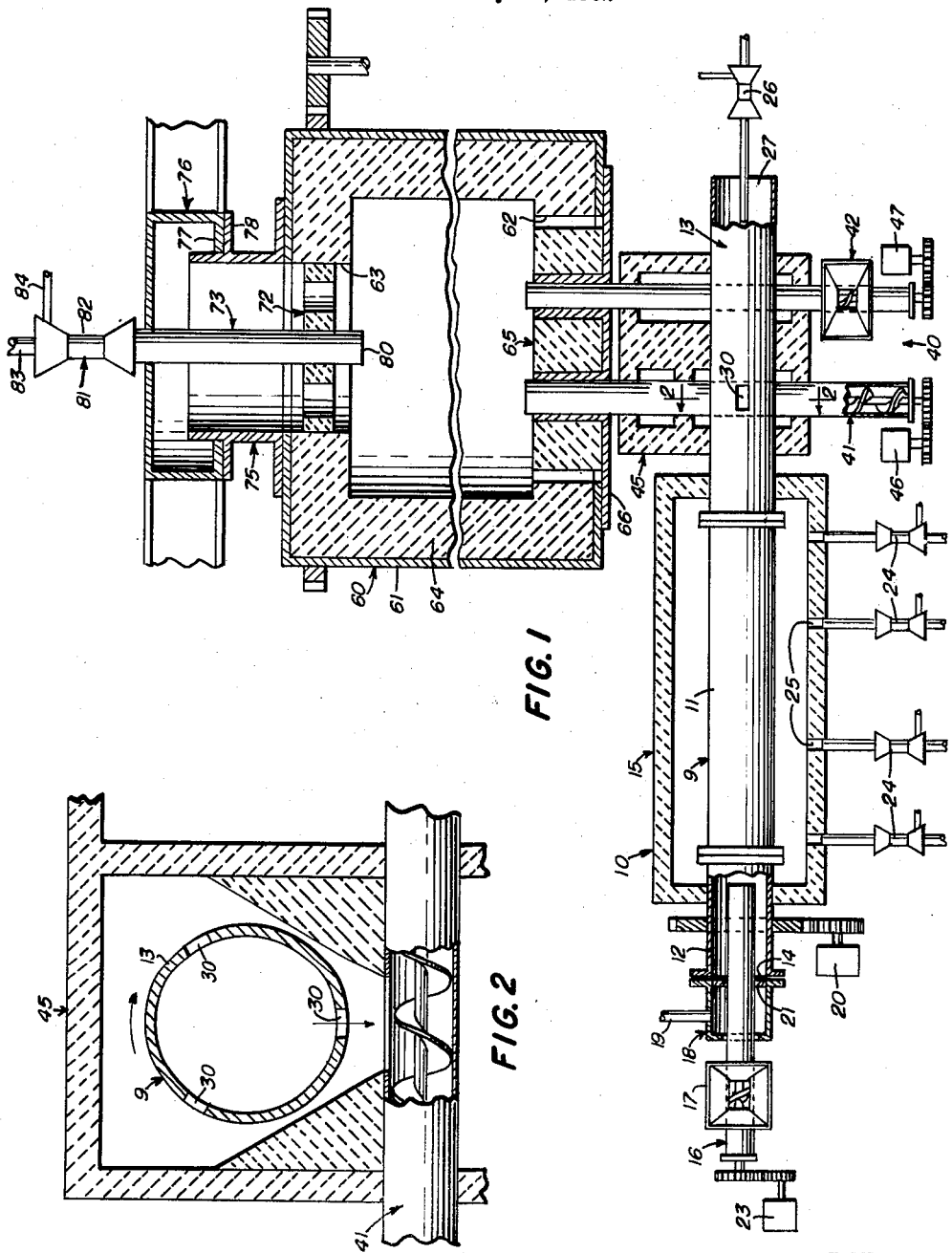

The invention herein described and claimed may be manufactured and used by or for the Government of the United States of America for governmental purposes without the payment of royalties thereon or therefor.

This invention relates to improvements in concentrating low grade copper and related ores, among which lead, zinc, gold, silver, and nickel are exemplary. This invention is more particularly disclosed in connection with an improved method of segregating copper from low grade sulfide, oxidized or mixed oxide-sulfide ores of copper. Exemplary of such ores are the sulfides chalcopyrite, chalcocite, bornite, and covellite, and the oxides chrysocolla, malachite, azurite, brochantite, cuprite, melaconite, and dioptase, and mixtures of one or more of any of the aforementioned sulfides and oxides. The method described makes available reliable procedures whereby copper may be segregated from low grade copper ores which would otherwise not be amenable to segregation. Consequently, these ores are thereby made more suitable for a subsequent concentration processing such as by flotation, screening and tabling, or by leaching.

Characteristic of the method constituting the invention is its novel and simple procedure for regulating the temperature and atmosphere in a furnace adapted to process low grade copper ore for segregating the copper from such ore. Previously, copper segregating procedures were usually carried out by preheating the ore in a direct fired furnace, followed by transferring the hot ore to a separate reactor furnace. In this furnace an admixture of the ore with coal or coke, was treated in the presence of a halide salt at a temperature lower than the melting point of copper but adequate to produce a reaction. By such segregation treatment copper in its metallic state was produced out of the ore particles containing the copper. The segregated calcine product of the reactor furnace was thereafter ground, and subjected to a flotation separation procedure wherein the copper particles were recovered from the particles constituting the furnace product. Exemplary of such procedures are the copper recovery processes disclosed in the Bureau of Mines Report of Investigations 5501, by the inventor and others, published in 1959, and in Patent No. 1,679,337, issued July 31, 1928 to Moulden et al., and in Patent No. 1,865,153, issued June 28, 1932, to Taplin. As indicated in the patent to Moulden et al., it is advantageous in such processes to heat the ore to a sufficiently high temperature before the admixture with the halide salt and carbonaceous material or fuel, in that rapid and economic heating is then possible, and the subsequent reaction may be effectuated with no additional heat supplied to the ore after the admixture. However, the processing of particularly low grade ores does not allow a temperature control and heating of this nature since even after these ores are adequately preheated, they do not generate enough heat in the reaction to sustain the required reaction temperature. As a result, following an initial period of reaction, further segregation of the copper from the ore is progressively inhibited. Inherent in Moulden et al.'s suggestion that additional heat might be provided in the reaction furnace by adapting external heating means thereto if it were found that the temperature in the furnace tended to become too low for the reaction, are certain serious drawbacks which are not present when a direct-fired kiln is utilized for this purpose as in the present invention. A suitable reaction furnace having indirect or external heating is invariably complicated, requiring an alloy steel shell construction. Since the ore-handling capacity of such indirectly fired furnaces is normally limited to relatively low tonnages, a multiplicity of furnaces would be needed for plants treating more than 350 tons per day. On the other hand, direct fired kilns are more effective, being of a simpler construction, and permitting the use therein of a brick lining insulation. In addition, the ore-handling capacity of a single direct fired kiln may range as high as 2000 tons per day. Accordingly, the present invention makes available procedures for a highly satisfactory continuing reaction by introducing auxiliary heat directly in the reaction zone along with a suitable control maintained over the reaction temperature and the furnace atmosphere. In the past, it was thought that segregation of copper could not be carried out successfully in the presence of combustion gases formed by burning oil or gas in the reactor furnace. The invention therefore provides an improved method in that it permits the use of direct-firing in the reactor furnace to control the temperature of the reactor furnace while simultaneously controlling the furnace atmosphere so that it is neither too highly oxidizing nor reducing.

An object of the invention is therefore to provide a method for segregating copper from copper ores and similarly treating related ores, in a reactor furnace wherein heat needed for continuing the reaction in the furnace is produced within the furnace, and supplied directly to the reaction zone.

A further object of the invention is to provide a method for segregating copper from copper ore and similarly treating related ores, in a reactor furnace wherein part of the heat needed to maintain a continuing reaction in the furnace is retained in the ore as supplied to the reaction zone, and part is initially made available within the furnace.

These and other objects, uses, and advantages of this invention will become apparent from the following detailed description thereof, considered together with the figures of the accompanying drawing in which:

FIG. 1 schematically illustrates one of the many possible arrangements of furnace, and furnace charge materials handling structures providing means with which the method of the invention may be accomplished; and FIG. 2 is a view through a portion of a materials handling structure taken along section line 2—2 shown in FIG. 1.

The ore treating apparatus exemplified by the showing in FIG. 1, has as its principal components, a preheat kiln 10, a segregation or reactor furnace 60, and a furnace charge materials handling arrangement generally indicated in the figure as a structure 40, which functions to operatively relate the kiln to the furnace. As indicated in FIG. 1, preheat kiln 10 comprises at its core, an elongated cylindrical structure 9, made up of a stainless steel tube 11, to the respective ends of which two similar mild steel tubes 12 and 13 are assembled by means of flange elements on the tubes being joined in a known manner. An enclosure 15, whose walls are lined with a refractory insulation material, provides a support wherein the cylindrical structure 9 may be slowly rotated about its longitudinal axis, at approximately 2 r.p.m., by means of a gear motor and chain drive 20. All of the tube 11, and relatively short partial lengths of tubes 12 and 13, are located within the enclosure 15, whereby they are situated in position to be heated by a number of gas burners 24, placed through suitable openings 25 in a wall of the insulated enclosure. An opening 14 at that end of the rotatable tube 12 extending outside of enclosure 15, is effectively closed off by a fixed housing 18 equipped with a gas vent 19, and operatively associated with opening 14 by means of a friction ring seal 21. Supported within the housing 18 and passing through the ring seal 21 is a choke feed screw apparatus 16 of conventional design. This apparatus extends a sufficient distance into the rotatable tube structure 9, such that the ore materials being fed into the kiln 10, are deposited upon portions of the surface inside the tube structure which are adjacent the burners 24. Ore materials provided for processing are first crushed to pass a Tyler Standard 10-mesh sieve, although ¼-mesh or coarser, or finer than 10-mesh may be used, and are supplied to the kiln 10 through a hopper mechanism 17 arranged over an opening in a portion of the feed screw apparatus 16, projecting out beyond housing 18. The ore feeder apparatus 16 is rotatively driven by a variable gear head drive 23, the speed of which is controlled so as to allow the ore supplied for tumbling through the rotatable cylindrical structure 9 to be heated to the required preheat temperature. In addition to the heat supplied indirectly by the burners 24, to the ore flowing within the cylindrical structure 9, further heat is supplied directly thereto by the flame of a natural gas burner 26 suspended within the open end 27 of the tube 13, extending beyond the discharge end of enclosure 15. Various other structural arrangements are applicable for preheating the ore, including one such as shown in the aforementioned Moulden et al. patent, wherein all the heat is supplied by a direct firing means C.

Tube 13 as shown in FIGS. 1 and 2, may be seen to have cut through at several places around its cylindrical wall, relatively narrow, rectangular slotted openings 30. The hot ore having rolled and shifted through heated sections of rotating structure 9, eventually reaches the slotted openings 30, and drops therethrough upon a second screw feeder apparatus 41 located below and at right angles to the path of the ore passing through structure 9. A refractory fire brick construction 45, extensively surrounding the feeder apparatus 41, effectively prevents cooling of the hot ore conveyed therein. Heat may be provided within the construction 45, as the need arises to maintain the ore at a proper temperature, by means of one or more gas burners received through holes in the bottom of this construction.

The reactor furnace 60, shown in FIG. 1, as comprising a cylindrical shell 61, characterized by its thick insulated walls 64, is provided with relatively wide circular openings 62 and 63, defining the charging and discharging ends thereof, respectively. Suitable support members (not shown), for the shell 61, allow it to rotate about its longitudinal axis. Any of the conventional drive arrangements such as a circumferential gear drive or chain and sprocket connected to a variable gear head drive motor, may be provided to slowly rotate the furnace shell 61, at approximately 2¼ r.p.m. Opening 62 in the charging end of the furnace, is substantially filled with a refractory lined gas seal block 65, which receives through an opening therein, the discharge end of the hot ore feeder apparatus 41. Closure of furnace opening 62 is made complete by a plate-like outer portion 66 of seal block 65, which overlaps and contacts the rim of this opening to obtain a sliding, friction seal therewith. A second opening through the block 65 provides a passage receiving therethrough a third screw feeder apparatus 42, which like the feeder apparatus 41, is for the most part enveloped within the construction 45. Feeder apparatus 42 carries within it the admixture of salt and coal or coke, which it supplies to the furnace 60, wherein this material mixes with the hot ore to constitute the furnace charge. Chain and sprocket gear head drive arrangements 46 and 47, are connected to the conveying screws of the feeder apparatus 41 and 42, respectively, and operate the latter in the usual manner.

Mounted within the discharge opening 63 of the reactor furnace 60, is a grate-type refractory plug 72 which acts to support a stationary elongated auxiliary gas burner 73. A steel cooling jacket 75, bolted to the rotatable shell 61, is operatively associated with a quench hood element 76, maintained fixed relative to the shell and hood, in position to cap, or cover over the furnace opening 63, with provision made by an opening therein for supporting the auxialiary burner 73, passing therethrough. As may be seen by reference to FIG. 1, the hood element 76 includes as an integral part thereof, a broad rim 77 which contacts a flange portion 78 or equal size, extending out from and encircling the cooling jacket 75. Lubrication applied between the rim 77 and flange 78, facilitates a sliding friction seal between these parts. As a result, furnace shell 61 and the cooling jacket 75 joined thereto, are operable to revolve relative to the stationary burner 73, and the various elemental parts connected thereto.

Auxiliary burner 73 is arranged for support in plug 72 and hood 76, so as to be concentrically related to the hood and cooling jacket 75, whereby the burner's flame end 80, is located within the furnace proper. At the auxiliary burner's opposite end 81, extending outside the hood 76, there is connected a conventional Venturi-type gas and air mixing device 82, supplied with gas through inlet conduit 83, and with low pressure air through inlet conduit 84. The gas and air are metered to the burner by means of conventional flowmeters, and appropriate control valves in the gas and air conduits 83 and 84. Although the auxiliary burner has been described in connection with the discharge end of the reactor furnace, it may be made equally effective when placed in the charging or feed end of this furnace. Operation of the burner 73, which is hereinafter described as being performed with the use of natural gas, may also be accomplished with other hydrocarbon fuels such as butane, propane, or fuel oil. Powdered coal and other solid carbonaceous fuels may be used for this purpose by replacing the gaseous or liquid burners with a solid fuel burner. However, for operations using each of the other fuels, a corresponding fuel to air ratio must be determined and maintained as will be further explained hereinafter.

The apparatus described in connection with FIGS. 1 and 2, is made operative for carrying out the method constituting the present invention by feeding the crushed ore through the hopper 17, screw feeder 16, and into the rotary kiln structure 9, where it is suitably preheated to the required temperature, which may range from about 500° to 900° C. In treating ore containing substantial quantities of sulfides, oxidizing the sulfides to the oxide form is highly desirable. However, if copper sulfide or other sulfide minerals are present in the ore, these are oxidized in the preheat furnace to the oxide form with the simultaneous removal of the sulfur as sulfur dioxide in the furnace gas atmosphere. Screw feeder apparatus 41, receives the preheated ore passing through the rectangular openings 30 in the cylindrical structure 9, and conveys it to charge the reactor furnace 60, the latter also receiving a charge of admixed salt and coal conveyed thereto on the screw feeder apparatus 42. Ore charged to the furnace 60, is hot, pulverulent, and granular, but not fused, and its screen size is not different, or is only very little changed from that fed to the preheat furnace. The coal and salt are fed as a dry mixture, with the coal usually being minus 48-mesh, and the salt minus 20-mesh in size. Nevertheless, salt or coal and coke coarser or finer than that indicated can be used with equal success. The charged materials are admixed as they are received within the reactor furnace, by the operation thereof, and a reaction zone is produced therein whereby there occurs a segregation of the copper from the copper ore.

According to practices heretofore applied in carrying out the reaction such as would occur in furnace 60 when only the heat of the charged ore and the reaction were relied upon for temperature control, there was easily maintained in the furnace a controlled atmosphere as devoid as possible of oxygen. Proceeding in this manner, a segregation or ores assaying 3.5 to 5 percent copper, had available from the reaction adequate heat to compensate for radiation losses of the furnace, and to maintain a reactor temperature of 700° to 750° C. However, such segregation procedures upon low grade oxidized copper ores assaying less than 2.5 percent copper, were found not to be successful. The heat of the segregation reaction was insufficient to maintain the temperature of the charge at the temperature of the ore entering the reactor which was in the range of 750° to 800° C. As a result the temperature in the reactor furnace rapidly dropped off until the segregation reaction ceased.

According to the present invention, there is made available for use in the aforesaid procedures, an auxiliary heat source to be applied within the reactor furnace and directly to the reaction zone, in the event segregation of a poor grade of copper ore does not allow the reaction to maintain a temperature adequate to continue the reaction. Since burning fuel for the auxiliary heat introduces combustion products to the reaction zone, a need also arises to control the furnace atmosphere at the same time its temperature is controlled by the added heat. Manifestly, the burner operation must not produce either too highly oxidizing or reducing atmosphere. It has been determined from data obtained on such burner operation, that when natural gas is used as the fuel, the gas and air fed to the auxiliary burner should be apportioned on a calculated basis of about 1 to 1.2 times the volume of air theoretically required to give complete combustion of the gas used. An analysis of a natural gas selected for use in one example of an operation according to the invention, indicated the following:

| Constituent: | Volume, percent |
|---|---|
| $CH_4$ | 84.0 |
| $C_2H_6$ | 9.0 |
| $C_3H_8$ | 3.5 |
| $N_2+CO_2$, etc. | 3.5 |
| Total | 100.0 |

The volume of air theoretically required to give complete combustion of this gas was calculated from the following formulas:

$$CH_4 + 2O_2 = CO_2 + 2H_2O$$
$$C_2H_6 + 3\tfrac{1}{2}O_2 = 2CO_2 + 3H_2O$$
$$C_3H_8 + 5O_2 = 3CO_2 + 4H_2O$$

When 1.2 times the theoretical quantity of air was used to burn any given volume of the aforesaid natural gas in the burner, close control of the segregation furnace temperature was achieved and optimum segregation of the copper was obtained. However, the use of theoretical air resulted in equally as good control of the segregation furnace temperature and gave almost as good segregation of the copper. Moreover, the proportions of gas to air required for optimum segregation may also vary in accordance with the type and efficiency of the burner used. It is therefore evident that by such selective introduction of gas and air for use in the auxiliary burner, there may be supplied to the reaction zone the heat necessary to maintain the segregation reaction, while the resulting combustion products produced by burner operation are sufficiently low in oxygen to prevent oxidation of the segregated copper, and in unreacted reducing gas to avoid reduction of the copper in the mineral particles themselves. A partial analysis of furnace gas produced during an optimum segregation in a typical operation of a reactor furnace utilizing heat from an auxiliary burner is as follows:

| Constituent: | Volume, percent |
|---|---|
| $H_2O$ | 30.0 |
| $CO_2$ | 9.7 |
| $CO$ | .6 |
| $O_2$ | 1.5 |
| Remainder (principally $N_2$) | 58.2 |
| Total | 100.0 |

As the table indicates, the gases were substantially neutral and consisted principally of nitrogen and water vapor with minor quantities of carbon dioxide, oxygen, carbon monoxide, and probably a trace of hydrogen.

To more clearly demonstrate the improved operation resulting from the application of the present invention, there are set out below the data of a segregation operation wherein an auxiliary burner was not used in the reactor furnace, for comparison with the data obtained in several similar operations, utilizing an auxiliary burner according to the invention.

EXAMPLE 1.—OPERATION WITHOUT AUXILIARY BURNER

A typical oxidized copper ore containing chrysocolla as the principal copper mineral was heated to a temperature of 750° C. in the preheat furnace 10 shown in FIG. 1, and then transferred to the reactor kiln 60, which had been preheated to 750° C. Salt and coal were added to the hot ore continuously but after about 60 minutes the temperature of the charge in the reactor dropped to 630° C. and the segregation reaction ceased. Pertinent data from this operation are as follows:

Ore analysis _____ percent, Cu__ 2.45
Feed rate to the two-stage plant _____lbs./hr__ 62
Temperature of ore to the reactor _____° C__ 740
Salt (NaCl) _____lbs./ton feed__ 60
Coal (semi-bituminous) _____do____ 20
Reactor charge temperature:
　After 20 minutes operation _____° C__ 678
　After 60 minutes operation _____° C__ 634
　After 80 minutes operation _____° C__ 616

EXAMPLE 2.—OPERATION WITH AUXILIARY BURNER USING AIR TO GAS RATIO OF 1.2 TO 1

In this operation the ore was heated to a temperature of about 785° C. in the preheat furnace 10, and transferred to the reactor kiln 60 which had been preheated to 780° C. Salt and coal then were added to the hot ore continuously with the auxiliary burner operated to maintain the reactor kiln temperature at about 780° C. The copper in the ore was segregated successfully in about 43 minutes. Fine grinding and flotation of the segregated calcine recovered 80.7 percent of the copper in a concentrate assaying 29.7 percent Cu. Pertinent data from the segregation operation and from the fine grinding and flotation procedures of the calcine are as follows:

*Segregation*

Ore analysis _____ percent, Cu__ 1.5
Feed rate to the two-stage plant _____lbs./hr__ 65
Temperature of ore to the reactor _____° C__ 786
Salt (NaCl) _____lbs./ton feed__ 40
Coal (semi-bituminous) _____do____ 10
Air-gas ratio to auxiliary burner:
　Natural gas _____liters/min__ 8.6
　Air _____do____ 105
Approximate ratio of air to gas _____ 1.2:1
Reactor charge temperature:
　At start of operation _____° C__ 786
　After 90 minutes operation _____° C__ 788

Flotation

| | | |
|---|---|---|
| Grind | maximum mesh size | 100 |
| Reagents: | | |
| Quick lime (CaO) | lbs./ton feed | 6 |
| Potassium amyl xanthate | do | .25 |
| Methylisobutylcarbinol frother | do | .24 |
| Product analyses: | | |
| Rougher froth (concentrate) | percent, Cu | 29.7 |
| Rougher tailing (reject) | do | .33 |
| Recovery of copper in rougher froth | percent | 80.7 |

EXAMPLE 3.—OPERATION WITH AUXILIARY BURNER USING AIR TO GAS RATIO OF 1.2 TO 1 BUT AT HIGHER TEMPERATURE THAN IN EXAMPLE 2

Segregation

| | | |
|---|---|---|
| Ore analysis | percent, Cu | 1.5 |
| Feed rate to the two-stage plant | lbs./hr | 64.5 |
| Temperature of ore to reactor | ° C | 820 |
| Salt (NaCl) | lbs./ton feed | 40 |
| Coal (semi-bituminous) | do | 10 |
| Air-gas ratio to auxiliary burner: | | |
| Natural gas | liters/min | 10.2 |
| Air | do | 132 |
| Approximate ratio of air to gas | | 1.2:1 |
| Reactor charge temperature: | | |
| At start of operation | ° C | 866 |
| After 170 minutes operation | ° C | 870 |

Flotation

| | | |
|---|---|---|
| Grind | maximum mesh size | 100 |
| Reagents: | | |
| Quick lime (CaO) | lbs./ton feed | 10.5 |
| Potassium amyl xanthate | do | .25 |
| Methylisobutylcarbinol frothers | do | .24 |
| Product analyses: | | |
| Rougher froth (concentrate) | percent, Bu | 38.5 |
| Rougher tailing (reject) | do | .27 |
| Recovery of copper in rougher froth | percent | 84.4 |

EXAMPLE 4.—OPERATION WITH AUXILIARY BURNER USING AN AIR TO GAS RATIO OF 1 TO 1

Segregation

| | | |
|---|---|---|
| Ore analysis | percent, Cu | 1.5 |
| Feed rate to the two-stage plant | lbs./hr | 65 |
| Temperature of ore to the reactor | ° C | 770 |
| Salt (NaCl) | lbs./ton feed | 40 |
| Coal (semi-bituminous) | do | 10 |
| Air-gas ratio to auxiliary burner: | | |
| Natural gas | liters/min | 10.2 |
| Air | do | 105 |
| Approximate ratio of air to gas | | 1:1 |
| Reactor charge temperature: | | |
| At start of operation | ° C | 788 |
| After 180 minutes operation | ° C | 776 |

Flotation

| | | |
|---|---|---|
| Grind | maximum mesh size | 100 |
| Reagents: | | |
| Quick lime (CaO) | lbs./ton feed | 6 |
| Potassium amyl xanthate | do | .25 |
| Methylisobutylcarbinol frother | do | .24 |
| Product analyses: | | |
| Rougher froth (concentrate) | percent, Cu | 21.2 |
| Rougher tailing (reject) | do | .46 |
| Recovery of copper in rougher froth | percent | 70.1 |

The above operations are typical examples of the results obtained when using an auxiliary burner in the reactor furnace. Similar results were obtained when using coke instead of coal as the reductant under a variety of conditions. Other carbonaceous materials such as charcoal and coal char produced from low-rank bituminous coals can be used with equal success.

While preferred procedures for the method of the invention have been illustrated and described herein, it is to be understood that the invention is not limited thereby, but is susceptible of changes in form and detail.

What is claimed is:

A method for segregating copper from low grade copper ore, comprising the steps of preheating the ore to a temperature within the range of from about 500° C. to about 900° C., charging the heated ore, a halide salt and a carbonaceous material from the group consisting of coal, charcoal, coke and coal char to a reaction zone wherein the charged materials are admixed, and subjecting the admixture, within the reaction zone, to the heat from the combustion of a controlled mixture of air and natural gas wherein the ratio of air to natural gas is from about 1.2 to 1 times the ratio theoretically required to give complete combustion of the gas.

References Cited in the file of this patent

UNITED STATES PATENTS

| | | |
|---|---|---|
| 890,563 | Jones | June 9, 1908 |
| 948,468 | Fink | Feb. 8, 1910 |
| 1,034,788 | Greene | Aug. 6, 1912 |
| 1,277,047 | Dawson | Aug. 27, 1918 |
| 1,679,337 | Moulden et al. | July 31, 1928 |
| 1,865,153 | Taplin | June 28, 1932 |